United States Patent
Rueger et al.

(10) Patent No.: US 6,705,544 B1
(45) Date of Patent: Mar. 16, 2004

(54) VALVE FOR CONTROLLING LIQUIDS

(75) Inventors: Johannes-Joerg Rueger, Vaihingen/Enz (DE); Patrick Mattes, Stuttgart (DE); Wolfgang Stoecklein, Stuttgart (DE); Udo Schulz, Veihingen/Ehz (DE)

(73) Assignee: Robert Bosch GmbH, Stuttgart (DE)

( * ) Notice: Subject to any disclaimer, the term of this patent is extended or adjusted under 35 U.S.C. 154(b) by 151 days.

(21) Appl. No.: 09/937,159

(22) PCT Filed: Nov. 24, 2000

(86) PCT No.: PCT/DE00/04172
§ 371 (c)(1),
(2), (4) Date: Feb. 11, 2002

(87) PCT Pub. No.: WO01/53693
PCT Pub. Date: Jul. 26, 2001

(30) Foreign Application Priority Data

Jan. 20, 2000 (DE) .......................... 100 02 270

(51) Int. Cl.⁷ ............................................. F16K 31/02
(52) U.S. Cl. ..................... 239/102.2; 239/584; 251/57; 251/129.04; 251/129.06
(58) Field of Search .................. 257/57, 129.04, 257/129.06; 239/96, 102.2, 533.4, 584; 137/627.5, 901

(56) References Cited

U.S. PATENT DOCUMENTS

| | | | | |
|---|---|---|---|---|
| 4,560,871 A | * | 12/1985 | Bowman et al. | 251/57 |
| 5,441,029 A | * | 8/1995 | Hlousek | 123/446 |
| 5,875,764 A | | 3/1999 | Kappel | |
| 6,076,800 A | * | 6/2000 | Heinz et al. | 251/129.06 |
| 6,142,443 A | * | 11/2000 | Potschin et al. | 239/102.2 |
| 6,427,968 B1 | * | 8/2002 | Stoecklein | 251/57 |

FOREIGN PATENT DOCUMENTS

| | | |
|---|---|---|
| DE | 197 32 802 A | 2/1999 |
| DE | 197 43 668 A | 4/1999 |
| DE | 198 13 983 A | 9/1999 |

* cited by examiner

Primary Examiner—John Bastianelli
(74) Attorney, Agent, or Firm—Michael J. Striker

(57) ABSTRACT

A valve (1) for regulating fluids has a piezoelectric unit (4) for actuating a valve member (3). The valve member is embodied with a control piston (9), adjacent to the piezoelectric unit (4), and with at least one actuating piston (14), adjacent to a valve closing member (15). A hydraulic chamber (16) functioning as a hydraulic booster is disposed between the pistons (9, 14). The valve closing member (15) cooperates with at least one valve seat (18, 19) and divides a low-pressure region (20) from a high-pressure region (21). An electric control unit (12) specifies the trigger voltage for the piezoelectric unit (4) as a function of the pressure level in the high-pressure region (21), a leakage loss from the low-pressure region (20) and the hydraulic chamber (16), and the refilling of the low-pressure region.

8 Claims, 1 Drawing Sheet

VALVE FOR CONTROLLING LIQUIDS

BACKGROUND OF THE INVENTION

The invention is based on a valve for regulating fluids.

One such valve is described, in German Patent Disclosure DE 197 328 02, for a fuel injection device of an internal combustion engine having a high-pressure system (common rail system). This fuel injection device has two valve seats, which cooperate with sealing faces of a valve closing member upon actuation by a piezoelectric drive in a sequence of motion, in which the valve closing member is initially in the closing position on the first valve seat, then is moved into an intermediate position between the valve seats, and then returns to a closing position against the second valve seat. To that end, a piezoelectric actuator is charged to a rail-pressure-dependent voltage, which causes an elongation of the actuator and a resultant motion of the valve closing member toward the second valve seat. For the reversing motion of the valve closing member in the direction of the first valve seat, the actuator is discharged again.

By the course of motion of the valve closing member from one valve seat to the other, a brief relief of a valve control chamber, which is under high pressure, is attained; by way of its pressure level, an opening and closing position of a valve needle is determined in the fuel injection device, which is embodied in force-balanced fashion, and the fuel injection is thus controlled. The fuel injection is enabled while the valve closing member is in an intermediate position between the two valve seats. In this way, even a double fuel injection, such as a pre-injection and a main injection, can be achieved by means of a single excitation of the piezoelectric drive.

Since the triggering of the valve member is done not directly but rather by means of a hydraulic booster, the pressure buildup in the hydraulic chamber, functioning as a hydraulic coupler, is decisive for the length of the stroke of the valve member. If the piezoelectric actuator is subjected to such high voltage that the valve closing member moves out of its valve seat, then some of the fuel quantity located in the hydraulic chamber is forced out via the leakage gaps from this chamber. This effect is especially pronounced if the control valve is held on the second valve seat, toward the high-pressure region, since in that case the counterpart force from the rail pressure is especially strong. The refilling of the low-pressure region or of the hydraulic coupler is done by means of a system pressure, which in practice can for instance amount to 15 bar, once again via these leakage gaps, but in this case only during the time while the piezoelectric actuator is not triggered.

The same is true for similar valves known from practice, which are equipped with only one valve seat and in which the valve closing member is lifted out of this valve seat and moved back again.

In all these valves, when injections occur in quick succession, the problem exists that the hydraulic coupler is as a rule not completely refilled. The valve stroke that is set with the same trigger voltage of the piezoelectric actuator and thus the same actuator stroke in these injections therefore varies. The closer together two injections occur, that is, the shorter the refill time between injections is, and the longer the actuator was previously triggered or in other words the greater the loading time of the hydraulic coupler and thus the greater the leakage quantity, the more marked is the adverse effect described. The variable actuator stroke in turn disadvantageously causes inaccuracies in metering the injection quantity; under some circumstances, the actuator stroke can be so short that it has no effect on the valve needle, and in the case involving use as a fuel injection valve, no fuel injection for instance occurs.

SUMMARY OF THE INVENTION

The valve of the invention for regulating fluids, has the advantage that the valve stroke that is set can be executed identically for all injections, by means of a suitably modified trigger voltage of the piezoelectric unit. It is thus possible, even at a high prevailing pressure level in the high-pressure region, to execute injections in quick succession, as may be necessary in a pre-injection, main injection and post-injection to improve the fuel consumption and emissions values, with a replicable stroke length for all the injections, since the varying fill level of the low-pressure region or of the hydraulic coupler, which is represented by the hydraulic chamber, can be compensated for by way of the trigger voltage.

With the valve of the invention, in which in addition to taking the pressure level in the high-pressure region into account, a modification of the trigger voltage is done as a function of leakage losses and refilling, a stable injection can advantageously be guaranteed.

In an especially advantageous version of the invention, it can be provided that to ascertain the leakage loss from the low-pressure region, a triggering duration of a preceding injection is output to the electric trigger unit. The triggering duration of the preceding injection represents a reliable variable for the quantity of hydraulic fluid that was expelled through leakage points during the loading time of the hydraulic coupler.

In a further advantageous version of the valve of the invention, it can provided that a time interval between an end of the preceding injection and the onset of the next injection is output to the electric control unit as a highly reliable value for the refilling of the low-pressure region, because this time interval as a rule does correspond to the refilling time. The fill factor of the coupler before the next injection can thus be determined from the refill time and the loading time.

Further advantages and advantageous features of the subject of the invention can be learned from the specification, drawing and claims.

BRIEF DESCRIPTION OF THE DRAWING

One exemplary embodiment of the valve of the invention for regulating fluids is shown in the drawing and will be described in further detail in the ensuing description. Shown are FIG. 1, a schematic detail showing one exemplary embodiment of the invention in a fuel injection valve for internal combustion engines in longitudinal section.

DESCRIPTION OF THE PREFERRED EMBODIMENTS

Figure 1:
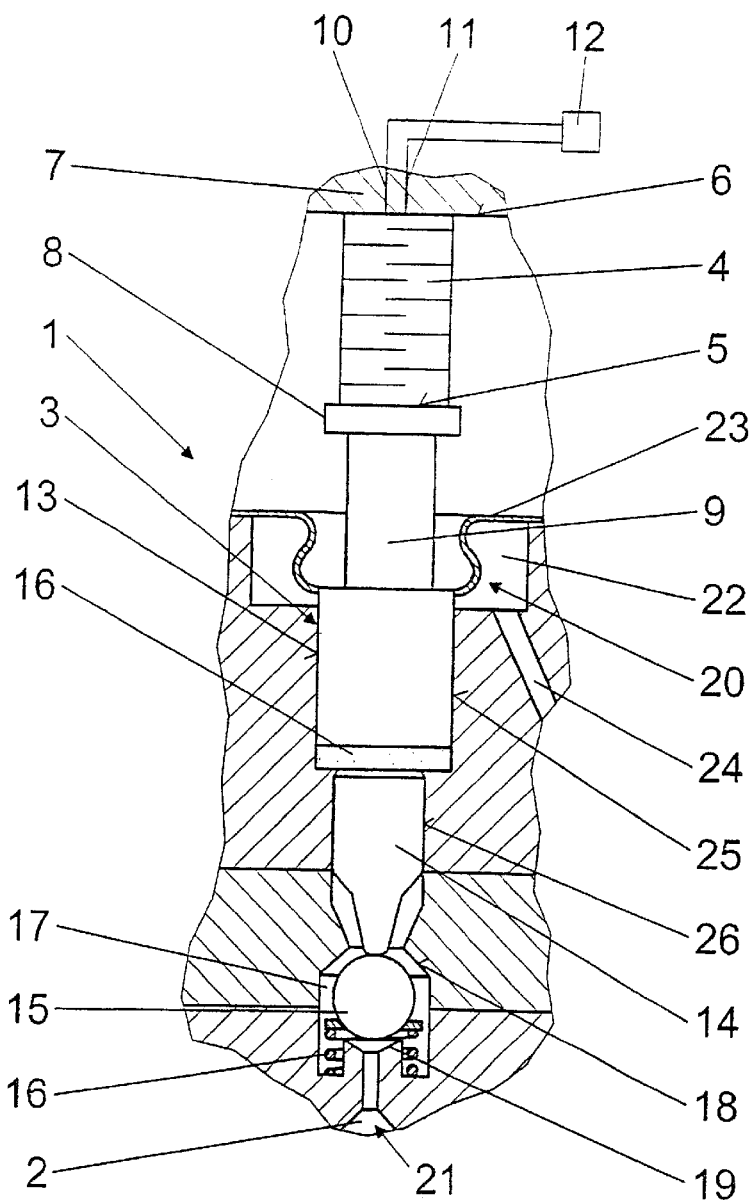

The exemplary embodiment shown in FIG. 1 illustrates a use of the valve of the invention in a fuel injection valve 1 for internal combustion engines of motor vehicles. The fuel injection valve 1 here is embodied as a common rail injector, and the fuel injection is controlled via the pressure level in a valve control chamber 2, which communicates with a high-pressure supply means.

To adjust an injection onset, injection duration and injection quantity via force ratios in the fuel injection valve 1, a valve member 3 is triggered via a piezoelectric unit, embodied with a piezoelectric actuator 4, which is disposed on the side of the valve member 3 toward the valve control chamber and the combustion chamber.

The piezoelectric actuator 4 is constructed of multiple layers in a known manner, and on its side toward the valve member 3 it has an actuator head 5, while on its side remote from the valve member 3 it has an actuator foot 6, which is braced against a valve body 7. A control piston 9 of the valve member 3 is embodied with a stepped diameter and contacts the actuator head 5 via a bearing plate 8.

To subject the piezoelectric actuator 4 to voltage, contacts 10, 11 are provided on the actuator base 6; they are connected to an electric control unit 12, shown only symbolically in FIG. 1, which triggers the piezoelectric actuator 4. The valve member 3 that can be actuated via the piezoelectric actuator 4 is disposed axially displaceably in a bore 13 embodied as a longitudinal bore and is embodied in multiple parts; besides the control piston 9, it also has an actuating piston 14, which is provided for actuation of a ball-shaped valve closing member 15. The control piston 9 and the actuating piston 14 are coupled to one another by means of a hydraulic booster.

The hydraulic booster, by means of which the deflection of the piezoelectric actuator 4 is transmitted to the valve closing member 15, is represented by a hydraulic chamber 16. Between the two pistons 9 and 14 defining this chamber, of which the actuating piston 14 is embodied with a smaller diameter than the control piston 9, the hydraulic chamber 16 encloses a common compensation volume. Between the control piston 9 and the actuating piston 14, the hydraulic chamber 16 is fastened in such a way that the actuating piston 14 executes a stroke that is lengthened by the boosting ratio of the piston diameter when the larger control piston 9 is moved by a certain distance by the piezoelectric actuator 4. The piezoelectric actuator 4, control piston 9 and actuating piston 14 are located one after the other on a common axis.

Besides providing hydraulic force transmission, the hydraulic chamber 16 also serves as a tolerance compensation element for variations in lengthwise expansion in the components of the fuel injection valve 1 caused by temperature gradients or different temperature expansion coefficients of the materials used, as well as for possible settling effects. The pistons 9 and 14 can dip into the volume of the hydraulic chamber 13 and withdraw again without causing any change in the position of the valve closing member 15 to be triggered.

The valve closing member 15 cooperates in a valve chamber 17 with two valve seats 18, 19, embodied on the valve body 7, on the end of the valve member 3 or actuating piston 14 toward the valve chamber. The first or upper valve seat 18 defines a low-pressure region 20, while the second or lower valve seat 19 leads to the valve control chamber 2, which is associated with a high-pressure region 21. A spring 28 is assigned to the second valve seat 19 and keeps the valve closing member 15 against the first valve seat 18 if the valve control chamber is relieved.

A movable valve control piston, not otherwise shown in the drawing, is disposed in the valve control chamber 2 of the high-pressure region 21. By axial motions of the valve control piston in the valve control chamber 2, an injection nozzle of the fuel injection valve 1 is controlled in a manner known per se. Typically, an injection line which supplies the injection nozzle with fuel also discharges into the valve control chamber 2. The injection line communicates with a high-pressure storage chamber (common rail) that is common to a plurality of fuel injection valves. The high-pressure storage chamber is supplied with fuel at high pressure from a tank in a known manner by a high-pressure fuel feed pump.

A valve system pressure chamber 22 adjoins the end of the bore 13 toward the piezoelectric unit. This hydraulic pressure chamber is defined on one side by the valve body 7 and on the other by a sealing element 23, which is connected to the control piston 9 of the valve member 3 and to the valve body 7, and which in this case is embodied as a bellowslike diaphragm and prevents the piezoelectric actuator 4 from coming into contact with the fuel contained in the valve system pressure chamber 22.

Since during a pause in triggering or current supply to the piezoelectric actuator 4 the hydraulic chamber 16 has to be refilled again, provision is made for compensating for a leakage quantity from the low-pressure region 20 by withdrawal of hydraulic fluid from the high-pressure region 21. This purpose is served by a filling device 24, which discharges into the valve system pressure chamber 22 and communicates with the hydraulic chamber 16 via a gap 25, surrounding the control piston 9, so that via the gap 25, filling of the hydraulic chamber 16 is also possible.

It is understand that in a version deviating from this, it may be provided that the filling device 24 discharges into a different hydraulic pressure chamber or directly into the gap 25 or into a gap 26 that surrounds the actuating piston 14.

The fuel injection valve 1 of FIG. 1 functions as described below.

In the closed state of the fuel injection valve 1 and with the piezoelectric actuator 4 uncharged, the valve closing member 15 of the valve member 3 is kept in contact with the upper valve seat 18 assigned to it, so that no fuel from the valve control chamber 2 communicating with the high-pressure storage chamber can reach the low-pressure region 20.

In the case of a slow actuation, as occurs in the event of a temperature-dictated change in length of the piezoelectric actuator 4 or other valve components, such as the valve body 7, the control piston 9 as the temperature increases penetrates the compensation volume of the hydraulic chamber 16, or retreats from it again if the temperature drops, without this having any effects on the closing and opening position of the valve member 3 and of the fuel injection valve 1.

If an injection by the fuel injection valve 1 is to take place, the piezoelectric actuator 4 is supplied with current, and as a result it abruptly increases its axial length. Via the control piston 9 and the hydraulic chamber 16, this elongation of the piezoelectric actuator 4 is transmitted to the actuating piston 14, as a result of which the valve closing member 15 is lifted out of the first, upper valve seat 18 and moved toward the second, lower valve seat 19 counter to the prevailing rail pressure.

In setting the voltage exerted on the piezoelectric actuator 4, not only the pressure level in the high-pressure region 21, that is, the rail pressure, but also the leakage loss on the low-pressure region 20 out of the hydraulic chamber 16 during a previous injection El and the refilling are taken into account by the electric control unit 12.

Figure 2:
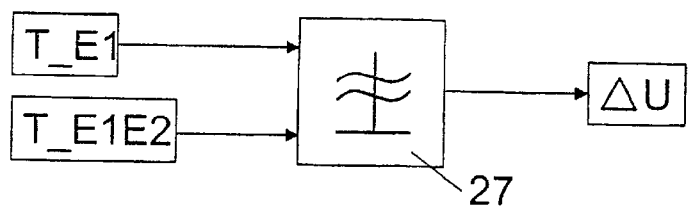
FIG. 2, a signal flow block diagram with a performance graph of an electric control unit for correction of the trigger voltage of a piezoelectric unit of the fuel injection valve of FIG. 1.

As FIG. 2 shows, the electric control unit 12 to this end has a performance graph 27; as input data, a triggering duration $T\_E1$ of the preceding injection El and a time interval T_E1E2 between the end of the preceding injection E1 and the onset of the next injection E2 are used. The triggering duration T_E1 of the preceding injection E1 and the time interval T_E1E2 indicate the leakage loss from the low-pressure region 20 and the refilling time since the preceding injection E1, respectively. As a function of these input data, a correction value of the trigger voltage ΔU is output; this is added to the fundamental value of the trigger voltage, which is dimensioned primarily on the basis of the rail pressure. The correction value ΔU of the trigger voltage is dimensioned such that the trigger voltage increases in successive injections, in order to compensate for a difference between the leakage loss and the refilling of the low-pressure region 20. In this way, a replicable stroke length of the valve member 3 or actuating piston 14 is attained, and it is assured that on the one hand a correct injection occurs, and on the other, the valve closing member 15 always achieves contact with the second valve seat 19.

The triggering of the piezoelectric unit becomes even more precise if the electric control unit 12 additionally corrects the trigger voltage with regard to the current temperature of the piezoelectric actuator 4.

It is understood that it may also be provided that the valve closing member 15 is stabilized in its middle position. Provision can also be made that the valve 1 does not function as a bidirectional valve, but than instead, the valve closing member cooperates only with the first valve seat 18. Triggering in which the valve closing member is moved at high speed and high voltage into the second valve seat 19, so that the injection takes place in the return motion from the second valve seat 19 to the first valve seat 18, is also conceivable in the valve of the invention.

It is understand that in a departure from the double-seat valve version shown, a version of the fuel injection valve with only one seat is also possible.

What is claimed is:

1. A valve for regulating fluids, having a piezoelectric unit (4) for actuating a valve member (3), which is axially displaceable in a bore (13) of a valve body (7) and is embodied with at least one control piston (9), adjacent to the piezoelectric unit (4), and at least one actuating piston (14), adjacent to a valve closing member (15), between which pistons a hydraulic chamber (16) acting as a hydraulic booster is disposed, and the valve closing member (15) cooperates with at least one valve seat (18, 19) for opening and closing the valve and divides a low-pressure region (20) from a high-pressure region (21), and the pressure level in the high-pressure region (21) is one parameter for setting a trigger voltage for the piezoelectric unit (4), characterized in that an electric control unit (12) specifies the trigger voltage for the piezoelectric unit (4) as a function of a leakage loss from the low-pressure region (20), in particular from the hydraulic chamber (16), and of the refilling of the low-pressure region.

2. The valve of claim 1, characterized in that to ascertain the leakage loss from the low-pressure region (20), a triggering duration (T_E1) of a preceding injection (E1) is output to the electric trigger unit (12).

3. The valve of claim 2, characterized in that the electric control unit (12) has a performance graph (27), by means of which a correction value (ΔU) for the trigger voltage is output as a function of the triggering duration (T_E1) of the preceding injection (E1) and/or the time interval (T_E1E2) since the preceding injection (E1).

4. The valve of claim 1, characterized in that to ascertain the refilling of the low-pressure region (20), a time interval (T_E1E2) between an end of the preceding injection (E1) and the onset of the next injection (E2) is output to the electric control unit (12).

5. The valve of claim 1, characterized in that a temperature of the piezoelectric unit (4) is one parameter for adjusting the trigger voltage.

6. The valve of claim 1, characterized in that the trigger voltage in successive injections is increased such that a difference between the leakage loss and the refilling of the low-pressure region (20) is compensated for, and the stroke of the valve closing member (15) is constant.

7. The valve of claim 1, characterized in that for refilling the low-pressure region (20), a filling device (24) is provided, which can communicate with the high-pressure region (21) and has a system pressure chamber (22), which discharges into a gap (26) surrounding the actuating piston (14) or into a gap (25) surrounding the control piston (9).

8. The valve of claim 1, characterized by its use as a component of a fuel injection valve for internal combustion engines, in particular of a common rail injector (1).

* * * * *